UNITED STATES PATENT OFFICE.

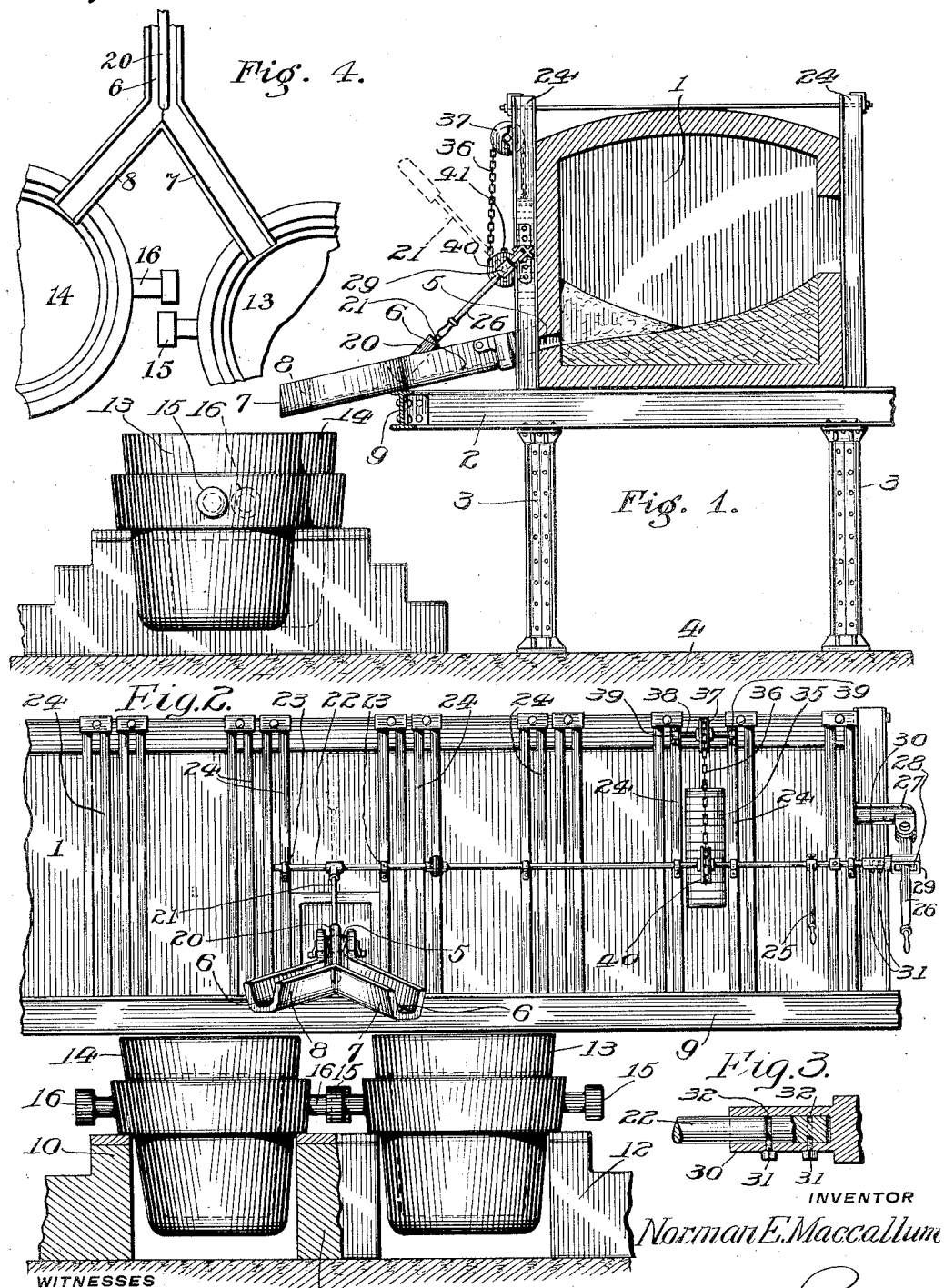

NORMAN E. MACCALLUM, OF PHOENIXVILLE, PENNSYLVANIA, ASSIGNOR OF ONE-FOURTH TO FRANK P. NORRIS, OF PHOENIXVILLE, PENNSYLVANIA, AND ONE-HALF TO THE PHOENIX IRON COMPANY, OF PHILADELPHIA, PENNSYLVANIA, A CORPORATION OF PENNSYLVANIA.

APPARATUS FOR MANUFACTURING STEEL.

959,146. Specification of Letters Patent. Patented May 24, 1910.

Application filed February 4, 1909. Serial No. 475,958.

*To all whom it may concern:*

Be it known that I, NORMAN E. MACCALLUM, a citizen of the United States, residing at Phoenixville, Chester county, State of Pennsylvania, have invented certain new and useful Improvements in the Apparatus for the Manufacture of Steel, of which the following is a specification.

This invention relates to improvements in the manufacture of steel and more particularly to improvements in the manufacture of open-hearth steel, and consists essentially in the means for directing and controlling the molten steel from the furnace to two or more ladles for the purposes and objects, and for attaining the results hereinafter particularly pointed out.

As is well known to those experienced in this art from a commercial standpoint, practically insuperable difficulties have heretofore existed in attempts to control or direct the flow of molten steel as from an open-hearth furnace, which steel in the molten state must necessarily be maintained at an enormously high temperature say of about 3000 degrees F. While it has been a comparatively easy proposition in the iron furnaces to direct the flow of molten iron as through sand conduits to different channels in the formation of pig iron, by reason of the comparatively low temperature at which the pig iron may be melted and flowed, no method or means to my knowledge, has heretofore been invented or discovered of directing and controlling molten steel as from an open-hearth furnace into two or more ladles in the process of steel manufacture, the enormously high temperature of the molten steel maintained in its passage from the furnace to the ladles and the great force with which the molten steel issues from the furnace almost precluding the thought of successfully controlling and directing it as set forth.

This invention therefore as before stated, relates to the means for thus controlling and directing the molten steel at enormous temperatures so that the same may be conducted from the furnace to two or more ladles in the manufacture of the product.

It has heretofore generally been the practice in the manufacture of open-hearth steel to provide each furnace with a ladle of sufficient capacity to hold the entire molten steel product derived from a single charge of the furnace; and in the operation of the furnace when the charge has been reduced or converted into steel of the desired quality an opening has been tapped in the furnace, and all of the molten steel in the furnace has been permitted to run through the tapped opening and into the single ladle without interruption. Usually each steel plant is provided with several furnaces, and two or more cranes to serve the ladles, the cranes being generally less in number than the furnaces. In this old process, the size of the charge of the furnace, and consequently the size of the furnace, is practically limited by the size of the largest ladle that can be conveniently handled.

It is well known that the maximum charge which may be reduced in any furnace varies almost directly in proportion to the size of the furnace; that a small furnace requires the same number of men to operate it as is required by a large furnace; and that the costs of repair, labor, material, brick, and fuel are all greater in a small furnace than in a large furnace, in proportion to the capacity of the furnace. The cost per ton of manufacturing steel is therefore reduced, as the size of the furnace is increased; but the maximum size of furnace which may be profitably handled with a single ladle has been found to have a capacity of about 75 tons although 50 tons is about the average size now in general use.

One of the objects of this invention is to provide improved apparatus for the manufacture of steel, and particularly for the manufacture of open hearth steel, to permit of the use of larger furnaces than have been heretofore considered practical and to permit the reduction of a larger charge and the use of smaller and more convenient ladles with any given furnace.

Further objects of this invention are to provide means whereby the molten contents of a furnace may be discharged simultaneously into two or more ladles; to provide means for controlling the flow of the molten metal from a furnace into each of two or more ladles; and to provide other improvements as will appear hereinafter.

In the accompanying drawings Figure 1 is a side elevation partly in section of an open-hearth steel furnace constructed in accordance with this invention; Fig. 2 a front elevation of the same; Fig. 3 a fragmentary sectional view of a portion of the same; and Fig. 4 a fragmentary top plan view of a portion of the same.

Referring to the drawings, one embodiment of the apparatus forming part of this invention comprises the usual open-hearth steel furnace 1, mounted upon the I-beams 2, supported by standards 3 from the ground of foundation 4. This furnace 1 is provided with the usual channel 5 leading therefrom, through which the molten contents of the furnace may be discharged. This channel 5 is kept closed by clay or other suitable means while the charge is being melted in the furnace, and an opening is tapped through the clay after each charge is reduced to permit the molten steel to be discharged.

Communicating with the furnace 1 through the channel 5 and extending outwardly and downwardly from the furnace, is a substantially Y-shaped trough or conductor, comprising a central portion 6, the inner end of which communicates with the channel 5, and the outer end of which is bifurcated forming two branch portions 7 and 8 communicating with the central portion. The trough is preferably made of sheet steel lined with fire brick and rests upon the I-beam 9, which is rigid with the I-beam 2 supporting the furnace.

Beneath the outer ends of the branches 7 and 8 of the trough are arranged spaced fixed supports 10, 11 and 12, for holding a pair of ladles 13 and 14, the combined capacities of which are at least equal to the capacity of the furnace. Each ladle 13 and 14 is provided with a pair of trunnions 15 and 16, whereby the ladle may be supported upon a crane or other conveyer, and the one ladle 13 is spaced at a greater distance from the furnace than the other ladle 14, whereby one of the trunnions 15 on one ladle overlaps the adjacent trunnion 16 on the other ladle, thus economizing the space between the ladles. The branches 7 and 8 of the trough are made of uneven length to correspond to the uneven spacing of the ladles from the furnace, whereby the outer end of each branch of the trough is brought into a proper position to discharge into its respective ladle.

For controlling the flow of metal through the branches 7 and 8 of the trough, a bar 20 protected by refractory material is mounted upon a crank arm 21 which extends obliquely upward and inward and the inner end of which is rigid with the end of a horizontal controller shaft 22 rotatably mounted in bearings 23 fixed upon the vertical supporting beams 24 upon the front of the furnace. The shaft 22 is provided adjacent its outer end with a handle bar 25 rigid therewith and radiating outwardly therefrom whereby the shaft may be rotated to move the bar 20 into and out of operative position in the central portion 6 of the trough adjacent the entrances to the branches 7 and 8 thereof.

The refractory bar 20 when in operative position, rests upon or near the bottom of the trough 6 and is inclined rearwardly and upwardly therefrom. The shaft 22 to which the bar 20 is connected is movable longitudinally to move the bar 20 horizontally in the trough to direct the greater portion of the flow therethrough into either one of the branches 7 or 8 thereof.

For moving the controller shaft 22 longitudinally a hand lever 26 is pivoted at one end to a bracket 27 fixed upon the front of the furnace adjacent the outer end of the shaft 22. This lever extends loosely through an aperture 28, provided therefor in a head 29, rotatably mounted upon the end of the shaft 22, the head having a tubular extension 30 rigid therewith telescoping loosely over the end of the shaft and being held rotatably in position thereon by means of set screws 31 threaded through the extension and engaging loosely in annular recesses 32 provided therefor in the cylindrical surface of the shaft. The head 29 is thus held against movement longitudinally with respect to the shaft 22 but is free to rotate thereon. By this construction the shaft 22 may be rotated in either direction or may be moved longitudinally by the separate movements of the handle bar and the hand lever, or both movements may be effected simultaneously.

For counter-balancing the controller and for holding the controller in an inoperative position, a series of weights 35 are provided, which are carried by a chain 36 between a pair of the spaced vertical beams 24 upon the front of the furnace. The chain 36 extends from the weights upwardly over a pulley 37 rotatably mounted upon a countershaft 38, carried in bearings 39 fixed upon the spaced beams 24, and the outer end of the chain is carried downwardly around a pulley 40, fixed upon the shaft 22, the outer end of the chain being secured to the pulley by means of a bolt 41. The weights 35 are so proportioned that the controller is normally held in an inoperative position, as shown in dotted lines in Figs. 1 and 2, only a slight amount of force being necessary to move the controller into operative position in the trough.

For limiting the longitudinal movement of the controller shaft 22, one of the bearings 23 is arranged adjacent to and at a suitable interval from the inner end of the tubular extension 30 of the head 29 when the controller is in its central position in the trough, and a longitudinally adjustable collar is secured upon the shaft at an equal interval upon the inside of the bearing, whereby the travel of the shaft is limited in one direction by the end of the tubular extension and in the other direction by the collar coming into contact with the bearing.

In the operation of this apparatus the furnace is charged as usual and the charge is reduced to molten steel by the usual process, the furnace is then tapped through the channel 5 and the entire molten contents of the furnace is then discharged through the channel 5 and trough, and simultaneously into the ladles, the flow into each ladle being governed by the manipulation of the controller in the manner above described.

It is evident in operating large furnaces, that were the steel to issue from the furnace, which it does with great force, without means of control, one branch of the spout might convey much more steel than the others, and the ladle which received the greater portion would overflow, causing loss of steel, and endangering the other ladles.

This invention may also be applied at small cost for installation to any steel plant where two or more ladle cranes are in use, and where the furnace capacity is greater than that of the ladle, and will enable any such plant to increase its product, to relatively decrease the cost of the product, and to profit by the general advantages gained by increased tonnage.

Although only a single form of apparatus has been described for putting this invention into practice, the invention is not limited to the particular apparatus described. Instead of the trough having but two branches a trough having any number of branches may be used and many other changes might be made in the construction disclosed without departing from the spirit of this invention or the scope of the appended claims.

Having thus fully described this invention, I claim, and desire to protect by Letters Patent of the United States:—

1. The combination with a stationary steel furnace, of a plurality of receptacles, means for discharging the contents of said furnace simultaneously from the furnace directly into said receptacles, and means for controlling the flow into each receptacle.

2. The combination with a stationary steel furnace provided with a channel for the discharge of molten steel from the furnace, of means communicating with said channel for conducting said molten steel simultaneously from the furnace directly into a plurality of receptacles, and means for controlling the flow into each of said receptacles.

3. The combination with a stationary steel furnace provided with a channel for the discharge of molten steel from the furnace, of a plurality of portable ladles, means communicating with said channel for conducting said molten steel simultaneously from the furnace directly into said ladles, and means for controlling the flow into said ladles.

4. The combination with a steel furnace, of a substantially Y-shaped conductor communicating with said furnace for discharging molten metal from said furnace simultaneously into a pair of receptacles, and means for controlling the flow into each of said receptacles.

5. The combination with a steel furnace of a bifurcated conductor communicating with said furnace for discharging molten steel from said furnace into a pair of receptacles, and means for controlling the flow into each of said receptacles.

6. The combination with an open-hearth furnace, of a conductor communicating therewith and leading therefrom for discharging molten metal from said furnace, the outer portion of said conductor being bifurcated to form branch conductors, a pair of portable ladles arranged beneath the outer ends of said branch conductors, and means for controlling the flow through each of said branch conductors.

7. A steel furnace having a channel for discharging the molten steel from the furnace with branch channels leading to two or more ladles, and a movable bar or grate provided in the first mentioned channel to regulate and control the flow of metal in the branch channels.

8. The combination with a conductor for a fluid current, of a controller for directing the flow of fluid therethrough, said controller comprising a longitudinal movable rotatable shaft, means for rotating said shaft and for moving said shaft longitudinally, movable means connected to said shaft to engage in said conductor, and means to hold said movable means out of engagement with said conductor.

9. The combination with a conductor for a fluid current of a controller therefor comprising a longitudinally movable rotatable shaft, means to rotate said shaft, a head carried by said shaft and fixed longitudinally thereof but rotatable with respect thereto, means engaging said head for moving said shaft longitudinally, and means carried by said shaft for engaging in said conductor for controlling the flow therethrough.

10. The combination with a steel furnace provided with a channel for the discharge of the molten steel from the furnace, of a conductor comprising a main portion communicating with said channel and leading outwardly therefrom, and branch portions of unequal length communicating with said main portion for directing the molten steel into a plurality of receptacles, a plurality of ladles each provided with trunnions, and means for supporting said ladles beneath the outer ends of said branch portions respectively and whereby said ladles may be arranged with a trunnion upon one ladle overlapping a trunnion upon an adjacent ladle.

11. The combination with a stationary steel furnace provided with a channel for the discharge of the molten steel from the furnace, of a conductor comprising a main portion communicating directly with said channel and leading outwardly therefrom, branch portions communicating directly with said main portion for directing the molten steel directly into a plurality of receptacles, and means for controlling the flow of metal through each of said branch portions.

12. The combination with a steel furnace of a conductor communicating with said furnace for discharging molten steel therefrom, said conductor comprising a central portion and two branch portions leading therefrom, and means mounted to engage in said central portion to distribute the flow of metal through said central portion into said branch portions.

13. The combination with a steel furnace of a conductor communicating therewith for conducting molten steel from said furnace, said conductor comprising a central trough inclined outwardly and downwardly from said furnace and terminating in a pair of branches communicating therewith, and a horizontally movable controller mounted to engage in said trough adjacent the entrance to said branches to control the flow of molten metal therethrough.

14. The combination with a steel furnace of a conductor communicating therewith for conducting molten steel from said furnace, said conductor comprising a central trough inclined outwardly and downwardly from said furnace and terminating in a pair of branches communicating therewith, and a horizontally and vertically movable controller mounted to engage in said trough adjacent the entrance to said branches to control the flow of molten metal therethrough.

15. The combination with a steel furnace, of a conductor communicating therewith for conducting molten steel from said furnace, said conductor comprising a central trough inclined outwardly and downwardly from said furnace and terminating in a pair of branches communicating therewith, a horizontally and vertically movable controller mounted to engage in said trough adjacent the entrance to said branches to control the flow of molten metal therethrough, said controller comprising a rotatable shaft mounted to be moved longitudinally and extending substantially horizontally, a crank arm rigid with said shaft at one end thereof, means connected with the free end of said crank arm for engaging in said trough, a handle bar at the other end of said shaft for rotating said shaft, and a hand lever pivoted upon an axis extending transversely of said shaft to move said shaft longitudinally.

16. The combination with an open-hearth steel furnace, of a conductor communicating therewith and leading therefrom for discharging molten metal from said furnace, the outer portion of said conductor being bifurcated to form branch conductors, and a pair of portable ladles arranged beneath the outer ends of said branch conductors, said ladles being spaced uneven distances from said furnace and said branch conductors being of unequal length and each of said ladles being provided with oppositely disposed trunnions, with a trunnion upon one ladle overlapping a trunnion upon an adjacent ladle.

17. The combination with a conductor for a fluid current, of a controller mounted to engage in said conductor to direct the flow therethrough, said controller comprising a longitudinally movable rotatable shaft, a handle bar rigid with said shaft for rotating the same, a head carried by said shaft fixed longitudinally thereof, but rotatable with respect thereto, a hand lever mounted to oscillate on a fixed axis and engaging said head for moving said shaft, and a counterbalance for said controller to hold the same normally in inoperative position.

18. The combination with a steel furnace, of stationary means for discharging molten steel from said furnace directly and simultaneously into a plurality of receptacles, and means for controlling the flow into each receptacle.

19. The combination with a steel furnace, of means for discharging molten steel from said furnace directly and simultaneously into a plurality of receptacles, and means located outside of said furnace for controlling the flow into each of said receptacles.

20. The combination with a steel furnace, of stationary means for discharging molten steel from said furnace directly and simultaneously into a plurality of receptacles, and means arranged outside of said furnace for controlling the flow into each of said receptacles.

21. The combination with a steel furnace provided with a channel for the discharge of molten steel from the furnace, of stationary means communicating with said channel for conducting said molten steel directly and simultaneously into a plurality of receptacles, and means for controlling the flow of steel into each of said receptacles.

22. The combination with a steel furnace, of a conductor for discharging molten steel from said furnace directly and simultaneously into a plurality of receptacles, and means engaging outside of said furnace in said conductor for controlling the flow of steel into each of said receptacles.

23. The combination with a steel furnace, of a stationary conductor for discharging molten steel from said furnace directly and simultaneously into a plurality of receptacles, and means engaging outside of said furnace in said conductor for controlling the flow of steel into each of said receptacles.

24. The combination with a steel furnace, of stationary means for conducting molten steel from said furnace directly and simultaneously into a plurality of receptacles, and means mounted to swing about a fixed axis and coöperating with said first mentioned means, for controlling the flow of metal into each of said receptacles.

25. The combination with a steel furnace, of stationary means for conducting molten steel from said furnace directly and simultaneously into a plurality of receptacles, and means mounted to swing about a fixed axis and coöperating with said first mentioned means, outside of said furnace, for controlling the flow of metal into each of said receptacles.

In witness whereof I have hereunto set my hand this 3rd day of February A. D. 1909.

NORMAN E. MACCALLUM.

Witnesses:
A. I. GARDNER,
ALEXANDER PARK.